United States Patent
Bertin et al.

(10) Patent No.: US 8,445,140 B2
(45) Date of Patent: May 21, 2013

(54) SOLID POLYMER ELECTROLYTES BASED ON TRIBLOCK COPOLYMERS, ESPECIALLY POLYSTYRENE-POLY(OXYETHYLENE)-POLYSTYRENE

(75) Inventors: Denis Bertin, Marseilles (FR); Trang Phan, Marseilles (FR); Renaud Bouchet, Marseilles (FR)

(73) Assignee: Arkema France, Colombes (FR)

( * ) Notice: Subject to any disclaimer, the term of this patent is extended or adjusted under 35 U.S.C. 154(b) by 923 days.

(21) Appl. No.: 12/294,946

(22) PCT Filed: Mar. 30, 2007

(86) PCT No.: PCT/EP2007/053080
§ 371 (c)(1),
(2), (4) Date: Sep. 29, 2008

(87) PCT Pub. No.: WO2007/113236
PCT Pub. Date: Oct. 11, 2007

(65) Prior Publication Data
US 2010/0221614 A1    Sep. 2, 2010

(30) Foreign Application Priority Data
Mar. 31, 2006  (FR) .................................... 06 51158

(51) Int. Cl.
*H01M 6/18*  (2006.01)
*H01M 10/0562*  (2010.01)

(52) U.S. Cl.
USPC ............ 429/304; 429/309; 429/310; 429/322

(58) Field of Classification Search
USPC ................. 429/304, 306, 309, 321, 322, 323, 429/310
See application file for complete search history.

(56) References Cited

U.S. PATENT DOCUMENTS
5,622,792 A    4/1997    Brochu et al.

FOREIGN PATENT DOCUMENTS
DE    297 285 A5    1/1992
EP    1 553 117 A1    7/2005
WO    WO-88 03154 A    5/1988

OTHER PUBLICATIONS
International Search Report for PCT/EP2007/053080 dated Jun. 19, 2007.
Fuellbier, H et al., "Polymeric solid electrolyte prodn. From lithium salt and block copolymer—of polyalkyl polymethacrylate and polyethylene oxide at autogenous pressure," Publication Date: Jan. 2, 1992, English Abstract of DD297281.

*Primary Examiner* — Carlos Barcena
(74) *Attorney, Agent, or Firm* — Millen, White, Zelano & Branigan, P.C.

(57) ABSTRACT

Solid polymer electrolyte (SPE) comprising at least one electrolyte salt and at least one linear triblock copolymer A-B-A, in which:
the blocks A are polymers that may be prepared from one or more monomers chosen from styrene, o-methylstyrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 1 to 10C alkyl methacrylates, 4-chloromethylstyrene, divinylbenzene, trimethylolpropane triacrylate, tetramethylolpropane tetraacrylate, 1 to 10C alkyl acrylates, acrylic acid and methacrylic acid;
the block B is a polymer that may be prepared from one or more monomers chosen from ethylene oxide (EO), propylene oxide (PO), poly(ethylene glycol) acrylates (PEGA) and poly(ethylene glycol) methacrylates (PEGMA).
Rechargeable battery cell or accumulator comprising an anode and a cathode between which is intercalated the said solid polymer electrolyte.

26 Claims, 6 Drawing Sheets

T > T_ODT            T < T_ODT 5.6K-10K-5.6K
48 wt % PEO

SOLID POLYMER ELECTROLYTES BASED ON TRIBLOCK COPOLYMERS, ESPECIALLY POLYSTYRENE-POLY(OXYETHYLENE)-POLYSTYRENE

TECHNICAL FIELD

The invention relates to solid polymer electrolytes based on triblock copolymers, which are especially polystyrene-poly(oxyethylene)-polystyrene copolymers or PS-b-PEO-b-PS.

The technical field of the invention may be defined in general as that of solid polymer electrolytes or SPEs that are especially used in lithium $Li^+$ accumulators.

An elemental cell of a rechargeable lithium battery or accumulator comprises (see FIG. 1) an anode (on discharging) (1), generally made of lithium metal or based on carbon, and a cathode (idem: on discharging) (2), generally made of a lithium insertion compound of metal oxide type such as $LiMn_2O_4$, $LiCoO_2$ or $LiNiO_2$, between which is intercalated a conductive electrolyte (3) of lithium ions.

In the event of use, thus during discharge of the battery (see FIG. 1), the lithium released by oxidation at the (−) terminal by the anode (1) in $Li^+$ ionic form migrates through the conductive electrolyte (3) and becomes inserted via a reduction reaction into the crystal network of the active material of the (+) terminal cathode (2). The passage of each $Li^+$ ion in the internal circuit of the accumulator is exactly compensated for by the passage of an electron in the external circuit (4), generating an electrical current that can serve to feed various appliances (5) in the portable electronics field such as computers or telephones, or in the field of applications of greater power and energy density, such as electrical vehicles.

During charging (FIG. 2), the electrochemical reactions are reversed, lithium ions are released by oxidation at the (+) terminal, "cathode" (2) (the cathode on discharging becomes the anode on recharging), they migrate through the conductive electrolyte (3) in the opposite direction to that in which they circulated during discharging, and they become deposited or intercalated by reduction at the (−) terminal, "anode" (1) (similarly, the anode on discharging becomes the cathode on recharging) where they can form dendrites of lithium metal (6), which are possible causes of short-circuits.

In accumulators, the electrolyte or ion conductor (3) that separates the electrodes is a fundamental element.

This electrolyte may be liquid or solid, or alternatively may be in the form of a porous polymer film, for example made of poly(vinylidene difluoride) (PVDF) or of poly(vinylidene-hexafluoropropylene) difluoride) (PVDF-HDP) impregnated with a liquid electrolyte.

Liquid electrolytes are generally based on carbonates such as propylene carbonate, ethylene carbonate and dimethyl carbonate. These liquid electrolytes have good conductivity, of about 1 mS/cm at room temperature, and permit functioning between −20 and 60° C. However, they do not offer optimum performance and safety conditions, in particular due to the formation of dendrites during charging, problems of thermal runaway, possible leaks, etc.

At the end of the 1970s, Armand et al. [1] demonstrated that "dry" polymers could possibly replace liquid electrolytes in $Li^+$ batteries. The electrolytes based on dry polymers, such as poly(oxyethylene) (PEO), although being safer, due to the absence of liquid, have conductivity values that are far too low for use at room temperature.

Thus, the conductivity σ obtained in document [1] with a system composed of PEO and $LiClO_4$ is only $10^{-7}$ S/cm.

Since then, research and development in the field of solid polymer electrolytes (SPE) that are not only light, flexible and easy to use, but also have ion conductivity at room temperature comparable to that of liquid electrolytes, has been actively pursued. Among the solid polymer electrolytes that may be mentioned, besides those based on PEO, are those based on:

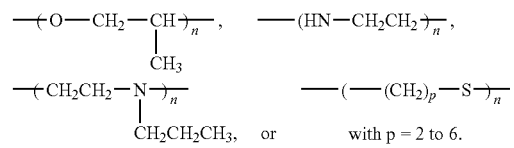

Attention is focused more particularly herein on solid electrolytes based on PEO.

In order to increase the conductivity of the PEO matrix of the solid polymer electrolyte, various means have been envisaged in the literature, among which mention may be made, for example, of:

The incorporation of a fraction of mineral nanofillers such as $SiO_2$, $TiO_2$ or $Al_2O_3$ into the PEO.

This incorporation of mineral nanofillers has the drawback of delicate implementation to obtain a uniform dispersion of the nanofillers, and also the presence of aggregates reduces the conductivity and mechanical properties.

Crosslinking of the PEO chains also plays an essentially mechanical role. The conductivity decreases with the degree of crosslinking by reducing the segment mobilities and also degrades the performance of the interface between the (−) terminal and the electrolyte (increase of the interfacial resistance in the case of lithium, passivation, degradation of the quality of the contact).

The drawbacks associated with crosslinking are thus essentially a problem of stability of the battery and lower conductivity.

The copolymerization of PEO macromers. The performance of PEO in terms of conductivity is found again since the size of the macromolecular chains is of the same order, otherwise the mechanical strength is insufficient. And finally, The production of PEO-based block copolymers.

It is via this last strategy that research studies have developed in recent years, by virtue of the extensive development of methods of controlled radical polymerization such as ATRP (Atom Transfer Radical Polymerization) and NMP (Nitroxide-Mediated Polymerization) in the mid-1990s, allowing these block copolymers to be prepared easily.

The PEO block copolymers used in solid polymer electrolytes (SPEs) may be A-B diblock copolymers or A-B-A triblock copolymers.

As regards the diblock copolymers, Sodaway et al. [2] were the first to study block copolymers as base for a solid polymer electrolyte (SPE). As regards diblock copolymers, their studies were essentially focused on diblock copolymers in which the first block is a poly(alkyl methacrylate) such as poly(lauryl methacrylate) (PLMA), poly(n-butyl methacrylate) (PnBMA) or poly(methyl methacrylate), and the second block is poly(polyethylene glycol methacrylate, containing 9 EO units) (PPEGMA). These copolymers were synthesized anionically or via the ATRP method.

The materials obtained are size-stable, do not flow and behave like an elastomer. The $LiCF_3SO_3$-doped PLMA-b-PPEGMA copolymer has a conductivity of about $8\times10^{-6}$ S/cm at room temperature and is electrochemically stable over a wide potential window.

Their studies also demonstrated that the conductivity of PPEGMA in these block copolymer electrolytes changes inversely proportional to the glass transition temperature Tg of the second block. Thus, $$\sigma_{PLMA-PPEGMA}(T_{gPLMA}=35°\,C.)>\sigma_{PnBMA-PPEGMA}$$
$$(T_{gPnBMA}=40°\,C.)>\sigma_{PMMA-PPEGMA}$$
$$(T_{gPMMA}=100°\,C.).$$

A cycling test was also performed on an Li/Li$^+$/VO$_x$ battery cell, the electrolyte used being the LiCF$_3$SO$_3$-doped PnBMA-PPEGMA copolymer. The test showed that the capacity of these batteries remains stable at 80% after 300 cycles.

The drawback of the SPEs prepared with the copolymers of the said document is the low conductivity at room temperature.

It is, admittedly, possible to increase the conductivity by lowering the glass transition temperature (Tg) of the materials (which then have an elastomeric nature), but the problem of feasibility of the films then arises.

As regards the triblock copolymers, Jannasch et al. [3] studied triblock copolymers prepared by the ATRP method, the central block of which is a PEO or a PEO-co-PPO and the outer block of which is poly(pentafluorostyrene) (PFS).

Short PFS blocks (T$_g$=33° C.) and the LiN(CF$_3$SO$_2$)$_2$-doped PEO or PEO-co-PPO block (T$_g$−65° C.) are immiscible, which leads to a microseparation of phases, giving the electrolytes advantageous electrical and mechanical properties.

With this system, they obtained an ion conductivity of $3\times10^{-5}$ S/cm. The conductivity of the PFS-PEO-co-PPO-PFS copolymer is slightly higher than that of the PFS-PEO-PFS copolymer, due simply to the proportion of the polyether, which is higher in PFS-PEO-co-PPO-PFS (85 wt %) than in PFS-PEO-PFS (71 wt %).

The major drawback of this system is that its conductivity is still not sufficiently improved at room temperature when compared with the systems already described previously in the literature. The advantage of such a structure such as SPEs is not demonstrated relative to PEO of the same molar mass.

Recently, Niitani et al. {4} described a novel triblock copolymer electrolyte composed of PPEGMA (23 EO units) as central block and of PS as outer blocks.

This copolymer, whose number-average molecular mass (M$_n$) is 250 700 g/mol, is prepared by the ATRP method, the PS blocks representing 8% by mass of the copolymer. The TEM images showed that the microphase separation depends on the proportion of PEO and of PS in the copolymer. The size of the PS or PEO domain is less than 100 nm and decreases as the proportion of PEO increases. The copolymer doped with LiClO$_4$ in a ratio (EO/Li=20) has good mechanical properties and has the highest ion conductivity at T=30° C. ($\sigma=2\times10^{-4}$ S/cm) known at the present time for the PSEs studied.

The Li/Li$^+$/LiCoO$_2$ battery cell has a discharge capacity at room temperature of 100 mAh/g at 0.1 C, and the battery also shows good charge/discharge reversibility.

The said document thus demonstrates a marked improvement in the ion conductivity, which is, nevertheless, still not similar to that of liquid electrolytes.

In addition, the copolymers of the said document have very high number-average molecular masses (M$_n$=250 700 g/mol), entailing very high viscosities. Consequently, they are very difficult to use with standard techniques such as extrusion.

Furthermore, the Li$^+$ transport number is low, which entails poor power behaviour and a large drop in capacity beyond C/10.

There is thus, with regard to the foregoing, a need for a solid polymer electrolyte (SPE) that not only has excellent mechanical and thermal properties, but also excellent conductive properties, and in particular high ion conductivity that is improved when compared with the known solid polymer electrolytes that may be used with conventional processes for obtaining films.

There is especially a need for a solid polymer electrolyte that is light, flexible, workable and easy to use, which has good mechanical strength and which also has a high ion conductivity, in particular at room temperature.

The aim of the present invention is to provide a solid polymer electrolyte (SPE) that satisfies, inter alia, the needs listed above.

The aim of the present invention is also to provide a solid polymer electrolyte (SPE) that does not have the defects, drawbacks, limitations and disadvantages of the solid polymer electrolytes of the prior art and that solves the problems of the solid polymer electrolytes of the prior art.

This aim and others are achieved, in accordance with the invention, by a solid polymer electrolyte (SPE) that comprises at least one electrolyte salt and at least one linear triblock copolymer A-B-A in which:

the blocks A are polymers that may be prepared from one or more monomers chosen from styrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 1 to 10C alkyl methacrylates, 4-chloromethylstyrene, divinylbenzene, trimethylolpropane triacrylate, tetramethylolpropane tetraacrylate, 1 to 10C alkyl acrylates, acrylic acid and methacrylic acid;

the block B is a polymer that may be prepared from one or more monomers chosen from ethylene oxide (EO), propylene oxide (PO), poly(ethylene glycol) acrylates (PEGA) and poly(ethylene glycol) methacrylates (PEGMA).

The blocks A may be homopolymers that may be prepared from a single monomer chosen from the monomers as listed above, or they may be statistical, random copolymers that may be prepared from several of the monomers mentioned above.

In particular, the blocks A may be homopolymers that may be prepared from a monomer chosen from styrene, o-methylstyrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 1 to 10C alkyl methacrylates, acrylic acid and methacrylic acid; or alternatively the blocks A may be statistical, random copolymers that may be prepared from a monomer described previously and from one or more other monomers chosen from 4-chloromethylstyrene, divinylbenzene, trimethylolpropane triacrylate, tetramethylolpropane tetraacrylate, 1 to 10C alkyl acrylates, acrylic acid and methacrylic acid.

The block B may be a homopolymer that may be prepared from a single monomer chosen from the monomers listed above, or alternatively the block B may be a statistical, random polymer that may be prepared from several monomers chosen from the monomers listed above for block B.

The SPEs according to the invention contain specific block copolymers of ABA type whose use in SPEs has never been described in the prior art.

The solid polymer electrolytes according to the invention have a combination of mechanical and electrical properties, due essentially to the ABA copolymers used, which has never been obtained hitherto.

The SPEs according to the invention, in particular when they are in the form of films or membranes, are supple and flexible, have a good mechanical strength and are workable. In addition, surprisingly, they also have an excellent electrical conductivity, which may, for example, be up to $9 \times 10^{-4}$ S/cm$^{-2}$ at room temperature (i.e. generally 20° C. to 30° C.), which has never been achieved in the prior art for solid electrolytes.

The solid polymer electrolyte according to the invention simultaneously satisfies, surprisingly, the two fundamental requirements for a solid polymer electrolyte, which are, firstly, high ion conductivity, and, secondly, excellent mechanical properties. These two characteristics were hitherto considered as being incompatible. The SPE according to the invention comprising the specific ABA copolymer described above thus goes against a widely held preconception in this field of the art and overcomes this preconception.

In the SPE copolymers according to the invention, the blocks A, for example of PS (polystyrene), give the SPEs the desired excellent mechanical properties, while the block B, for example of PEO, gives them ion conductivity.

The triblock polymers ABA are composed of two chemically dissimilar and thus immiscible polymers, linked together via covalent bonds. Under certain conditions, a strong repulsion between the blocks induces microseparation of phases characterized by the organization of the microdomains into regular and periodic structures.

It has been demonstrated, unexpectedly, that the ABA triblock copolymers in which the block A represents, respectively, less than 30% by mass of the copolymer lead to a microseparation of phases, forming microdomains, as shown in FIG. 3 in which discrete domains of blocks A interconnected by blocks B are observed.

According to the invention the microstructuring of the block copolymers in an SPE is exploited, in an entirely novel and surprising manner. This microstructuring of the specific ABA copolymers used according to the invention appears to be the main cause leading to SPEs having excellent mechanical properties.

FIGS. 4A and 4B show that the temperature range (T) for use of the SPEs is lower than the Order-Disorder temperature ($T_{ODT}$) of the block copolymers, and that it is combined with high ion conductivity.

Preferably, the blocks A are chosen from polystyrene (PS) blocks, poly(1 to 10C alkyl methacrylate) blocks, poly(acrylic acid) blocks, poly(methacrylic acid) blocks, statistical, random poly(styrene/acrylic acid) blocks, statistical, random poly(styrene/methacrylic acid) blocks, statistical, random poly(1 to 10C alkyl methacrylate/acrylic acid) blocks and statistical, random poly(1 to 10C alkyl methacrylate/methacrylic acid) blocks.

Preferably, the blocks B are chosen from poly(ethylene oxide) (PEO) blocks, poly(propylene oxide) (PPO) blocks, statistical, random, PEO/PPO copolymer blocks, poly(poly(ethylene glycol) methacrylate) blocks and poly(poly(ethylene glycol) acrylate) blocks.

Generally, said poly(ethylene glycols) contain from 2 to 5000 EO units.

Advantageously, the ABA triblock copolymer of the SPE according to the invention is chosen from the following polymers:

copolymers in which the block B is a PEO block and the two blocks A are poly(1 to 10C alkyl methacrylate) blocks (Formula (I));

copolymers in which the block B is a PEO block and the two blocks A are poly(acrylic acid) blocks or poly(methacrylic acid) blocks;

copolymers in which the block B is a PEO block and the blocks A are polystyrene blocks;

copolymers in which the block B is a poly(poly(ethylene glycol) acrylate) or poly(poly(ethylene glycol) methacrylate) block and the blocks A are polystyrene blocks;

copolymers in which the block B is a poly(poly(ethylene glycol) acrylate) or poly(poly(ethylene glycol) methacrylate) block and the blocks A are poly(acrylic acid) blocks;

copolymers in which the block B is a poly(poly(ethylene glycol) acrylate) or poly(poly(ethylene glycol) methacrylate) block and the blocks A are poly(1 to 10C alkyl methacrylate) or poly(methacrylic acid) blocks.

The SPE copolymer according to the invention may correspond to one of the formulae (I), (II), (III) and (IV) below:

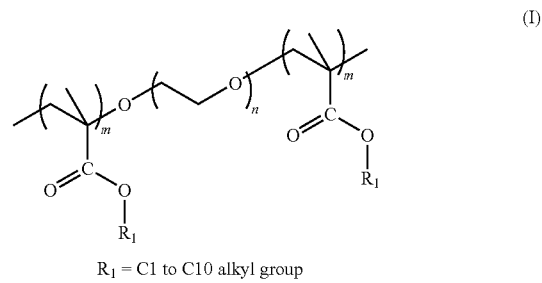

$R_1$ = C1 to C10 alkyl group

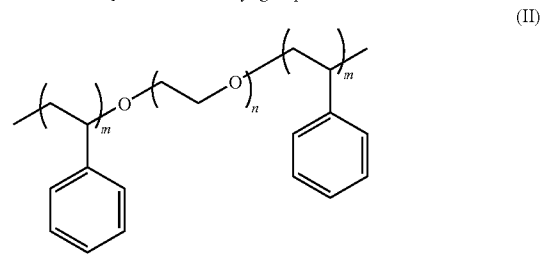

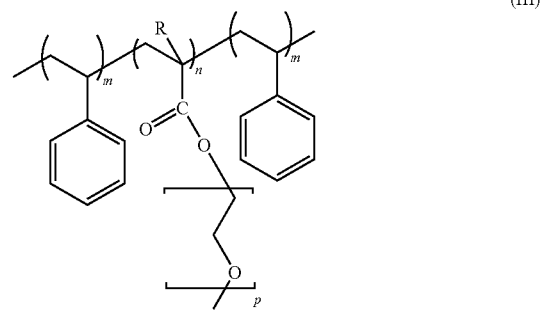

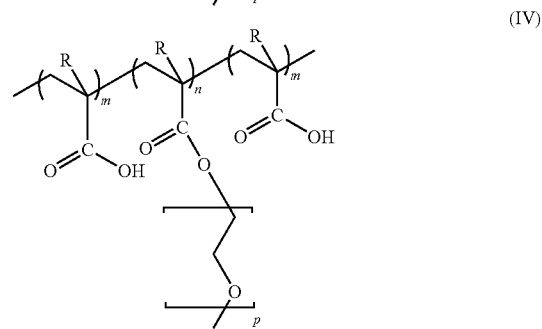

in which m is an integer from 5 to 1000, n is an integer from 2 to 5000, p is an integer from 2 to 50, $R_1$ represents a 1 to 10C alkyl group, and R represents H or $CH_3$.

The copolymers that are more preferred according to the invention are the copolymers in which the block B is a PEO block and the blocks A are polystyrene blocks, namely the PS-b-PEO-b-PS copolymers (Formula (II)).

Advantageously, the proportion of blocks A, for example of PS, is less than or equal to 35%, preferably less than or equal to 30%, more preferably strictly less than 30% and better still less than or equal to 25% by mass relative to the total mass of the copolymer. Preferably, the proportion of blocks A, for example of PS, is from 10% to 35%, more preferably from 15% to 30% and better still from 20% to 25% by mass relative to the total mass of the copolymer.

The number-average molecular mass of each of the blocks A, for example of PS, is generally from 500 g/mol to 30 000 g/mol, preferably from 1000 g/mol to 10 000 g/mol and more preferably from 1500 to 3000 g/mol, for example 1800 g/mol.

The blocks A of the SPE copolymer according to the invention may be a photocurable, photocrosslinkable, or heat-curable, heat-crosslinkable polymer in order to improve the mechanical properties of the SPE while at the same time keeping good ion conduction of the matrix due to the block B.

In other words, the blocks A may be photocured, photocrosslinked or heat-cured, heat-crosslinked after the nanostructuring and production of the SPE.

The (number-average) molecular mass of the block B, for example of PEO, is generally from 2000 g/mol to 200 000 g/mol, preferably from 5000 g/mol to 20 000 g/mol and more preferably from 8000 to 15 000 g/mol, for example 10000 g/mol.

The number-average molecular mass of the copolymers of the SPEs according to the invention is generally from 2500 g/mol to 260 000 g/mol, preferably from 10 000 g/mol to 50 000 g/mol and more preferably from 12 000 to 30 000 g/mol, for example 13600 g/mol.

The ABA triblock copolymers used according to the invention may be prepared by known processes.

The copolymers of the SPEs according to the invention, in particular the PS-PEO-PS copolymers, may be prepared especially by an NMP process, method, or an ATRP process.

In the text hereinbelow, essentially the synthesis of PS-b-PEO-b-PS triblock copolymers is illustrated, but it is quite clear that these synthetic processes may also be applied to the other block copolymers according to the invention by means of a few adaptations within the capability of a person skilled in the art in this technical field.

The NMP method consists in synthesizing, in a first stage, a PEO-based macroalkoxyamine and then in polymerizing styrene.

Several synthetic routes have been developed. The first consists of coupling between the alkoxyamine AMA-SG1 (V) and dihydroxylated PEO via N,N'-dicyclohexylcarbodiimide (DCC) and 4-dimethyl-aminopyridine (DMAP) to form the difunctional macroalkoxyamine SG1-AMA-PEO-AMA-SG1 (VI). The triblock copolymer PS-PEO-PS is obtained by polymerizing styrene in the presence of the difunctional macroalkoxyamine at 110° C.

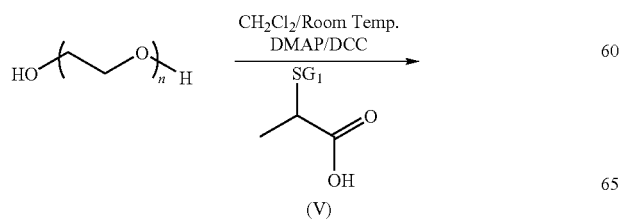

(V)

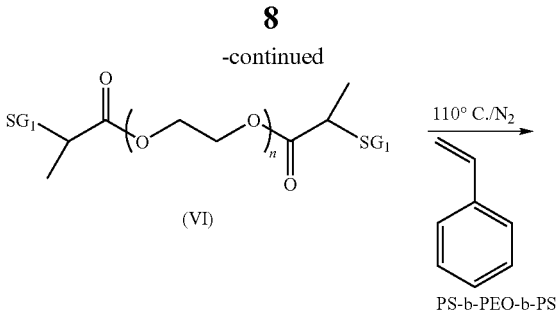

(VI)

It is pointed out that SG1 denotes the fragment

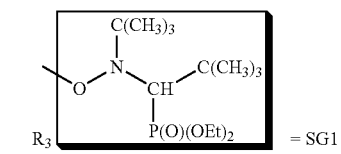

The second consists of coupling between an acryloyl halide and dihydroxylated PEO in the presence of triethylamine to form a poly(ethylene oxide) diacrylate (VII). The difunctional macroalkoxyamine SG1-MAMA-PEO-MAMA-SG1 (IX) is then obtained by a 1,2 addition reaction of MAMA-SG1 (BlocBuilder™ (VIII)) to the poly(ethylene oxide) diacrylate. The triblock copolymer PS-PEO-PS is obtained by polymerizing styrene in the presence of the difunctional macroalkoxyamine at 110° C.

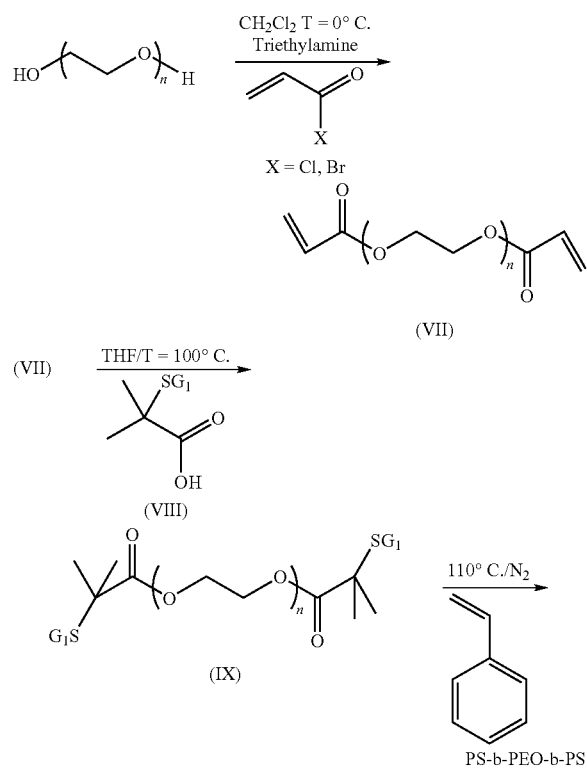

The ATRP method consists in performing, in a first stage, coupling between bromoisobutyryl bromide and dihydroxylated PEO in the presence of triethylamine to form the difunctional macroinitiator Br-PEO-Br. The triblock copolymer PS-PEO-PS is prepared by initiating styrene with the difunctional macroinitiator at 110° C. in the presence of CuBr and N-[2-(dimethylamino)ethyl]-N,N',N'-trimethyl-1,2-ethanediamine (PMDETA) as ligand.

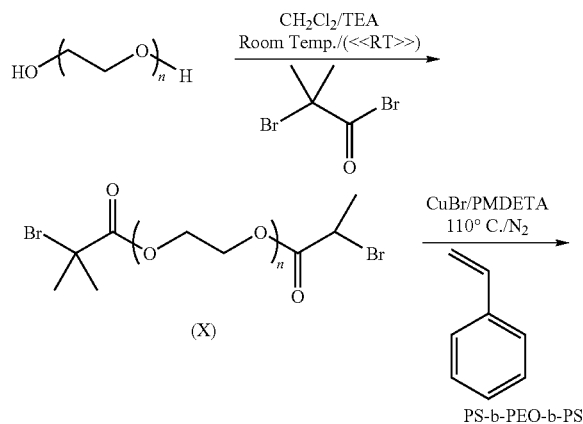

The solid polymer electrolyte of the present invention comprises at least one ABA copolymer as described above and an electrolyte salt.

It is possible, for example, to use only one ABA copolymer; a mixture of several ABA copolymers, each having different structural units; or a mixture of at least one ABA copolymer and of at least one other copolymer (which is not an ABA) and/or of a homopolymer. The said other copolymer or homopolymer is chosen, for example, from PEOs, PSs and PS-b-PEOs, and a PEO is preferably chosen.

A preferred solid polymer electrolyte comprises a linear ABA triblock copolymer, for example PS-PEO-PS and a PEO, and, of course, an electrolyte salt.

The electrolyte salt used in the solid polymer electrolyte according to the invention may be any electrolyte salt known to those skilled in the art.

Examples of these salts include alkali metal salts, quaternary ammonium salts such as $(CH_3)_4NBF_6$, quaternary phosphonium salts such as $(CH_3)_4PBF_6$, transition metal salts such as $AgClO_4$, or acids such as hydrochloric acid, perchloric acid, fluoroboric acid, phosphoric acid and sulfuric acid.

Examples of electrolyte salts include the conventional alkali metal salts such as $LiCF_3SO_3$, $LiB(C_2O_4)_2$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, KI, $LiCF_3CO_3$, $NaClO_3$, NaSCN, $KBF_4$, $KPF_6$, $Mg(ClO_4)_2$ and $Mg(BF_4)_2$, and mixtures thereof.

The lithium salts are particularly preferred.

The amount of electrolyte salt added, defined by the ratio [central block B such as EO]/Li (in moles) is generally in the range from 0.01 to 200, preferably from 0.02 to 100 and more preferably from 15 to 30.

The solid polymer electrolyte according to the invention may also comprise a mineral filler. This mineral filler is generally chosen from oxides such as $SiO_2$, $TiO_2$ and $Al_2O_3$, and mixtures thereof. Generally, this mineral filler is in the form of nanoparticles.

The mineral filler generally represents from 1% to 20% and preferably 1% to 15% by weight of the SPE.

A solid polymer electrolyte according to the invention may be prepared via a process in which the ABA copolymer and the electrolyte salt are dissolved, in the desired [EO]/Li ratio, in a suitable solvent chosen, for example, from tetrahydrofuran, methyl ethyl ketone, acetonitrile, ethanol, dimethylformamide, $CH_3CN$ and $CH_2Cl_2$, and mixtures thereof.

The solution obtained generally has a concentration of from 1% to 20% by weight, for example 5% by weight. The mineral filler, for example $TiO_2$, $SiO_2$ or $Al_2O_3$, preferably in the form of nanoparticles, may then optionally be added to said solution.

The solution obtained after the optional addition of the mineral filler generally has a weight concentration of from 1% to 20% by weight, for example 10% by weight.

The said solution may then be homogenized for a time generally of from 15 minutes to 10 hours, for example two hours, and the solvent may be evaporated off by slow evaporation.

Alternatively, the solid electrolyte may be prepared via a process in which the copolymer and the electrolyte salt are mechanically mixed together, either at room temperature or with heating.

The solid polymer electrolyte thus prepared may then be made into any desired form, for example in the form of a membrane, a film or a sheet with a thickness of, for example, from 10 to 200 μm.

To prepare a solid electrolyte in the form of a sheet, film or membrane, any known technique may be used, such as spin coating, roll coating, curtain coating, extrusion, etc.

For example, a solution of SPE containing a polymer, an electrolyte salt and optionally a filler is deposited onto a substrate, the solvent is evaporated off to form a film on the said substrate, and the substrate is then separated from the film or membrane.

The SPE may undergo a heat treatment, for example at a temperature of from 40 to 100° C. for a duration of from 2 hours to 300 hours, for example for 96 hours at 50° C.

The invention also relates to a rechargeable battery or accumulator cell comprising an anode and cathode between which is intercalated a solid polymer electrolyte as described above.

Preferably, the anode is made of lithium metal or based on carbon and the cathode is made of a lithium insertion compound.

Embodiments of the invention will now be described hereinbelow, especially with reference to examples given as non-limiting illustrations.

This description is given in relation with the attached drawings, in which.

Figure 7:
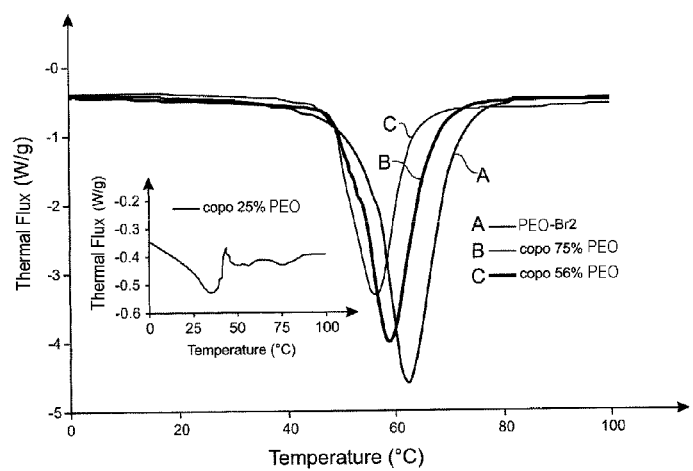

FIG. 7 is a differential scanning calorimetry (DSC) graph which shows the influence of the size and length of the PEO blocks on the melting point m.p. of the PEO block of various copolymers: namely: a PEO-Br$_2$ (Precursor X, difunctional PEO) (curve A); a PS-PEO-PS copolymer containing 75% by mass of PEO (curve B); a PS-PEO-PS copolymer containing 56% PEO (curve C); and a PS-PEO-PS copolymer containing 25% PEO (insert curve).

Figure 8:
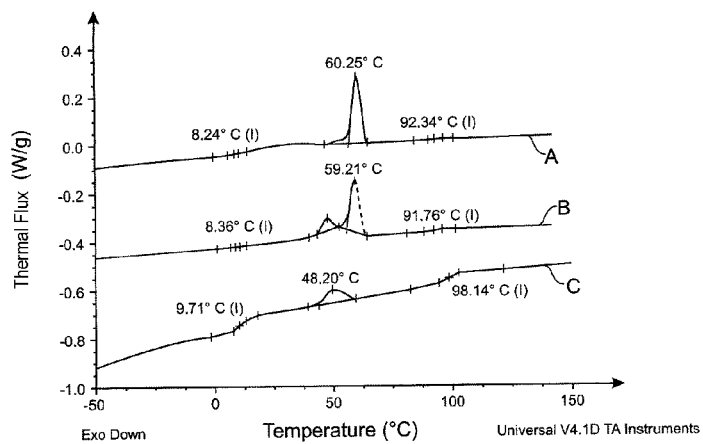
Figure 9:
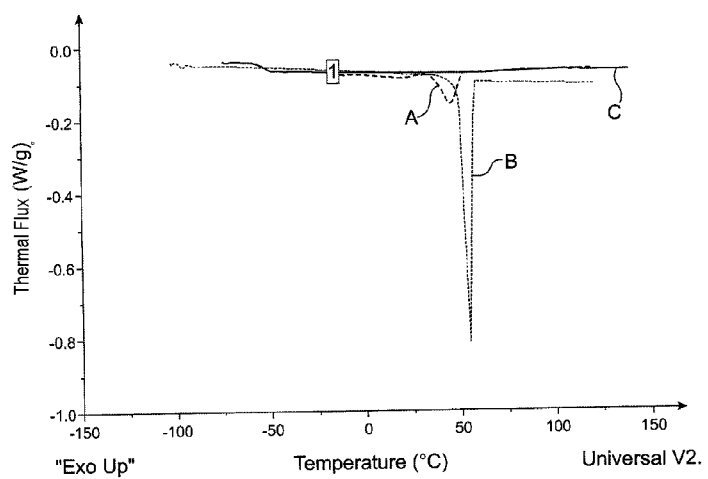
Figure 10:
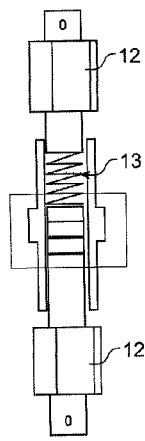
Figure 11:
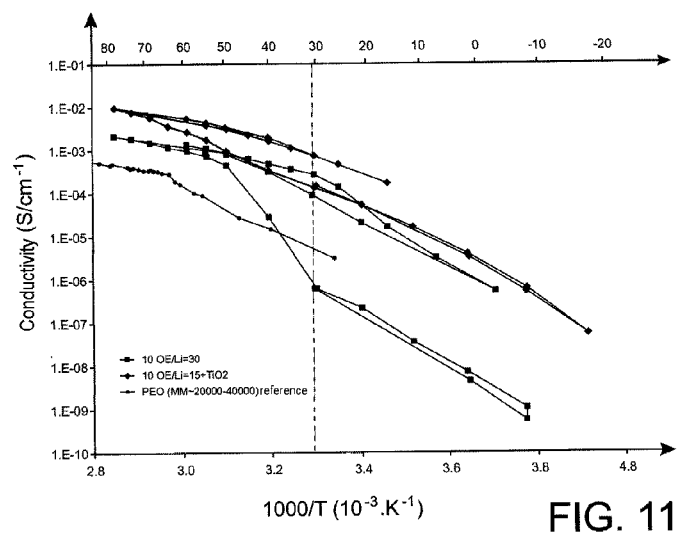

The temperature T is given on the x-axis (in ° C.) and the thermal flux is given on the y-axis (in W/g);

FIG. 8 is a differential scanning calorimetry (DSC) graph which shows the influence of the microstructuring on the melting point m.p. of the PEO block of various PS-PEO-PS copolymers (9.7K-10K-9.7K). Namely: a non-nanostructured precipitated polymer which has undergone a first heating cycle (curve A), a non-nanostructured precipitated polymer which has undergone a second heating cycle (curve B); and finally a microstructured film obtained by casting with toluene (curve C);

FIG. 9 is a differential scanning calorimetry (DSC) graph which shows the influence of the proportion of addition of the lithium salt in an SPE prepared with the copolymer of Example 4. Namely: copolymer with [EO]/Li=30 (curve A), copolymer without Li (curve B) and copolymer with [EO]/Li=15 (curve C);

FIG. 10 is a schematic view in cutaway of a cell of "Swagelok" type used for measuring the conductivity of the SPE films;

FIG. 11 is a graph representing the conductivity of various SPE films based on PS-PEO-PS copolymer (1.8K-10K-1.8K). Namely, an SPE with a ratio [EO]/[Li]=30 (curve with ■); an SPE with a ratio [EO]/[Li]=15 with addition of TiO$_2$ (curve with ◇); and finally a reference PEO (molecular mass of 20 000 to 40 000) (curve with ●).

Figure 12:
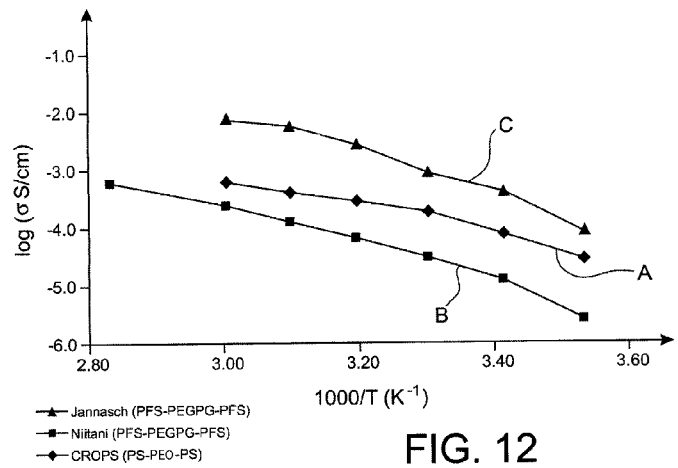

The conductivity (in S·cm$^{-1}$) is given on the y-axis and 1000/T (in 10$^{-3}$·K$^{-1}$) is given on the x-axis;

FIG. 12 is a graph representing the conductivity of various SPEs as a function of the temperature.

Namely, the Jannash SPE [3] (PFS-PEGPG-PFS) (curve A), the Niitani SPE [4] (PFS-PEGPG-PFS) (curve B), and finally the SPE according to the invention (curve C). The conductivity (log/σ in S/cm) is given on the y-axis and 1000/T (K$^{-1}$) is given on the x-axis.

EXAMPLE 1

Synthesis of the Macroalkoxyamine
SG1-AMA-PEO-AMA-SG1 (VI)

In a 100 mL two-necked round-bottomed flask, 15 g of α,ω-hydroxylated PEO (Mn=10 000 g/mol), 2.2 g of alkoxyamine AMA-SG1 (2 equivalents) and 0.37 g of DMAP (1 equivalent) are dissolved, solubilized in 45 mL of dichloromethane. The reaction mixture is degassed by bubbling nitrogen through for 10 minutes. Using a syringe, 1.5 g of DCC (2.4 equivalents) dissolved in 5 mL of dichloromethane are introduced dropwise into the reaction mixture at a temperature of 0° C. The reaction mixture is left to react for 20 hours and is then filtered to remove the dicyclohexylurea formed. Next, the filtrate is precipitated from diethyl ether. The macroalkoxyamine SG1-AMA-PEO-AMA-SG1 (VI) is recovered by filtration and then dried under vacuum. The degree of coupling determined by $^1$H NMR is 98%.

EXAMPLE 2

Synthesis of the Macroalkoxyamine
SG1-MAMA-PEO-MAMA-SG1 (IX)

In a three-necked round-bottomed flask, 10 g of α,ω-hydroxylated PEO (Mn=10 000 g/mol) and 1.4 mL of triethylamine are dissolved in 40 mL of dichloromethane. The reaction mixture is degassed by bubbling nitrogen through for 20 minutes. Using a dropping funnel, 0.9 mL of acryloyl chloride dissolved (5 equivalents) in 10 mL of dichloromethane is introduced dropwise at a temperature of 0° C. The mixture is left to react for about 15 hours. The reaction mixture is filtered to remove the triethylammonium chloride. The filtrate is washed twice with 20 mL of saturated aqueous NaHCO$_3$ solution. The organic phase is precipitated from diethyl ether. The PEO diacrylate is recovered by filtration and then dried under vacuum. $^1$H NMR analysis shows a degree of coupling of greater than 95%.

Next, 2 g of PEO diacrylate are introduced into a Schlenk tube equipped with a "Rotaflo". 0.16 g (4.2 mmol) of MAMA-SG1 (VIII) dissolved in 6 mL of THF is introduced onto the PEO diacrylate. The suspension is deoxygenated by bubbling nitrogen through for 30 minutes. The Schlenk tube is immersed in an oil bath thermostatically maintained at 100° C. for 1 hour. The THF is evaporated off under vacuum at room temperature.

$^1$H NMR analysis shows a degree of radical-mediated coupling of about 85%. $^{31}$P NMR analysis shows the disappearance of the alkoxyamine methacrylic acid-SG1 (27.4 ppm) and the appearance of dialkoxyamine at 24.23 ppm (major diastereoisomer, 69%) and at 24.6 ppm (minor diastereoisomer, 31%).

EXAMPLE 3

Synthesis of PS-PEO-PS Block Copolymers of
Molar Mass (5600 g/mol-10000 g/mol-5600 g/mol)

6.3 g of macroalkoxyamine (VI), 15 g of styrene and 10 g of toluene are introduced at room temperature into a 100 mL three-necked round-bottomed flask. After degassing for 20 minutes by bubbling nitrogen through, the reaction medium is brought to 110° C. and maintained at this temperature by heat regulation for 5 hours. The PS-PEO-PS copolymer is recovered by precipitation from ether, filtered off and dried under reduced pressure at room temperature. The mass percentage of PEO in the copolymer is 48% and the $M_n$=21 200 g/mol.

EXAMPLE 4

Synthesis of PS-PEO-PS Block Copolymers of
Molar Mass (1800 g/mol-10000 g/mol-1800 g/mol)

6 g of macroalkoxyamine (VI), 9 g of styrene and 15 g of toluene are introduced at room temperature into a 100 mL three-necked round-bottomed flask. After degassing for 20 minutes by bubbling nitrogen through, the reaction medium is brought to 110° C. and maintained at this temperature by heat regulation for 150 minutes. The PS-PEO-PS copolymer is recovered by precipitation from ether, filtered off and dried under reduced pressure at room temperature. The mass percentage of PEO in the copolymer is 75% and the $M_n$=13 600 g/mol.

EXAMPLE 5

Preparation of a Thin Film of the Copolymer

The copolymer prepared in Example 4 or in Example is dissolved in toluene to a concentration of 10 w/v %. The solution is filtered through a 0.45 μm filter and then deposited on a silicon wafer by spin coating (200 rpm for 10 seconds). The solvent is evaporated off slowly under a bell jar at room temperature. The films have a thickness of about 40 nm. The AFM analyses were performed on an AFM Dimension 3100® machine (Veeco Instrument®) operating in "tapping" mode at room temperature.

EXAMPLE 6

Figure 1:
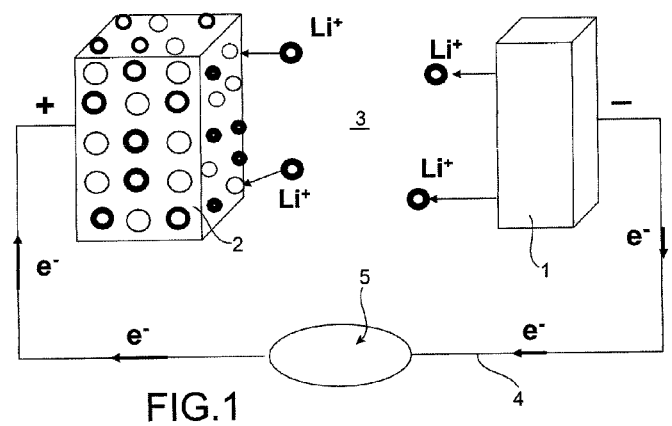
FIG. 1 is a schematic view of an elemental cell of a lithium accumulator during discharging.
Figure 2:
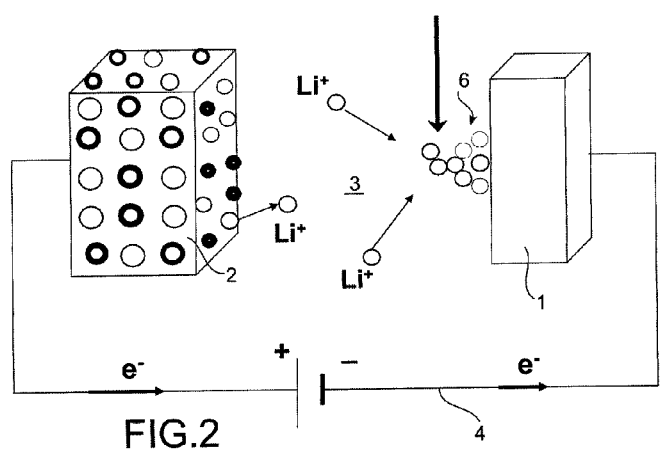
FIG. 2 is a schematic view of an elemental cell of a lithium accumulator during charging.
Figure 3:
FIG. 3 is a schematic view which represents the structure of ABA block copolymers in which the block A represents less than 30% by mass of the copolymer.
Figures 4A, 4B:
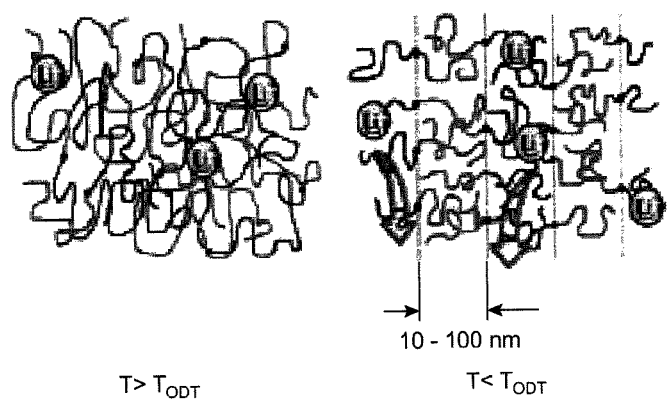
FIG. 4A is a schematic view which represents the microstructuring of ABA block copolymers at a temperature T above the order-disorder temperature ($T_{ODT}$) of these ABA block copolymers.
FIG. 4B is a schematic view which represents the microstructuring (at a scale of 10 to 100 nm) of the ABA block copolymers at a temperature T below the order-disorder temperature ($T_{ODT}$) of these ABA block copolymers.
Figure 5:
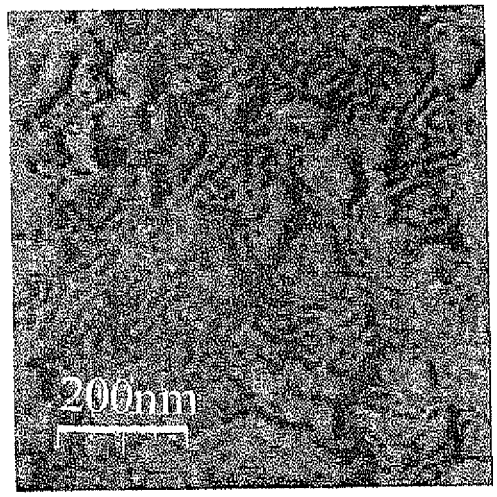
FIG. 5 is an AFM (Atomic Force Microscopy) image of the thin film of the PS-PEO-PS copolymer of Example 3: 5.6K-10K-5.6K (48% by weight of PEO), idem FIG. 6.

The thin films prepared in Example 5 are observed by AFM. The AFM images of the various thin films obtained are presented in FIGS. 5 and 6, respectively, for the copolymers 5.6K-10K-5.6K (48% PEO) and 1.8K-10K-1.8K (75% PEO).

Irrespective of their topology, these well-defined copolymers become organized conventionally and in accordance with the literature.

An organization with different orientations may be observed, depending on the surface energy of the blocks and that of the substrate; for example, cylinders oriented parallel or perpendicular to the substrate are observed.

Figure 6:
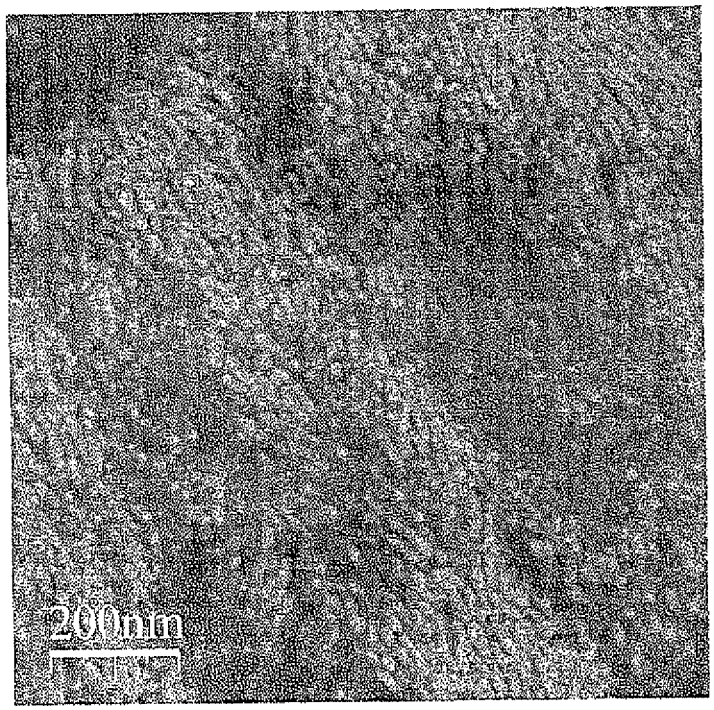
FIG. 6 is an AFM image of a thin film of the PS-PEO-PS copolymer of Example 4: 1.8K-10-1.8K (75% by weight of PEO). The scale represented on the image is 200 nm.

More specifically, the film of the copolymer of Example 3 (5.6K-10K-5.6K) with 48% by weight of PEO is lamellar (FIG. 5), and the film of the copolymer of Example 4 (1.8K-10K-1.8K) with 75% by weight of PEO has polystyrene cylinders 18 nm in diameter (FIG. 6).

The copolymers prepared in Examples 3 to 4 are also characterized by modulated DSC (FIGS. 7 and 8).

All the copolymers have two distinct glass transition temperatures Tg indicating the immiscibility of these two blocks.

The Tg of the PS blocks (94° C.) is close to that of homoPS (Tg=100° C.), whereas the Tg of the PEO block is much higher (about 9° C.) than that of homoPEO (Tg=−56° C.)

This may be explained by the fact that the PEO block is the central block of a triblock copolymer, and its properties would thus be different from those of a homopolymer.

FIG. 7 shows that the length of the PS blocks inhibits the crystallization of the PEO block and, consequently, indicates a decrease in the melting point (m.p.) of the PEO when the length of the PS blocks increases.

The influence of the nanostructuring on the melting point of the PEO is also observed. For the same copolymer, the "organized" film has an m.p. lower than that of an unorganized film (FIG. 8). It is noted that the heat treatment facilitates the self-organization of the chains; specifically, a second m.p., attributed to the organized domains of the sample, appears during the second heating cycle.

EXAMPLE 7

In this example, a solid polymer electrolyte (SPE) is prepared with the polymer of Example 4, which is mixed with the salt $LiN(CF_3SO_2)_2$ (LITFSI).

The ratio [EO]/[Li] is 30.

A film is then manufactured with the SPE thus prepared, in the following manner: 0.5 g of PS-PEO-PS copolymer (Mn=13 600 g/mol) and 0.08 g (EO/Li=30) of $LiN(CF_3SO_2)_2$ are dissolved in 5 mL of an acetonitrile-dichloromethane mixture (60/40 v/v). The homogeneous solution is then spread onto a Teflon support. The solvent is evaporated off at room temperature for 24 hours, then at 60° C. under vacuum for 24 hours. A uniform film of solid polymer electrolyte with a thickness of about 110 μm is obtained. The film is mounted onto an impedance measuring cell of Swagelok type.

EXAMPLE 8

In this example, a solid polymer electrolyte (SPE) is prepared with the polymer of Example 4, which is mixed with the salt $LiN(CF_3SO_2)_2$. The ratio [EO]/[Li] is 15. The SPE manufacturing conditions are analogous to those of Example 7.

A film is then manufactured with the SPE thus prepared, in the same manner as in Example 7.

A DSC analysis of the SPEs of Examples 7 and 8 is performed: it is clearly seen that the copolymer with [EO]/[Li]=15 has much more of a crystalline zone.

EXAMPLE 9

A solid polymer electrolyte and a film of this SPE are prepared under the same conditions as in Example 7, but a mineral filler is added, namely $TiO_2$ in a proportion of 10% of the solid polymer electrolyte.

The films of solid polymer electrolyte (SPE) of Examples 7 to 9 are mounted in a conductivity measuring cell of Swagelok type such as that represented in FIG. 13. In such a cell, a film (11) of the solid polymer electrolyte is placed between two stainless-steel pistons (12) equipped with a spring (13). The measurements are performed by impedance spectroscopy in a first stage towards the low temperatures, and then, in a second stage, towards the higher temperatures, before returning to room temperature, the measuring frequency range extending from 0.1 Hz to 100 kHz. For each temperature, a stabilization period of 24 hours was used before taking the measurement.

The ion conductivity is calculated by the following relationship:

$$\sigma = l/(R \times A)$$

in which
l is the thickness of the film
A is the area of the cell
R is the resistance.

The results of the conductivity measurements obtained are given in FIG. 11, which shows the change in conductivity (in $S \cdot cm^{-1}$) as a function of the temperature for various SPE films studied.

For a salt concentration, the addition of $TiO_2$ barely improves the ion conductivity of the SPE, however the presence of $TiO_2$ gives mechanical strength to the film with a high salt concentration (EO/Li=15).

Over the temperature range studied, there is a mild hysteresis phenomenon and a change in slope for the film of EO/Li=30 (characteristic of the melting of the crystalline domains of PEO). The conductivity increases by more than 2 orders of magnitude for the film with EO/Li=30 and 1 order of magnitude for the film with EO/Li=15 during the second passage of the sample towards the higher temperatures. This improvement is attributed to the nanostructuring of the film facilitated by the heat treatment.

The better conductivity at room temperature obtained in this study is equal to $9 \times 10^{-4}$ S/cm for an SPE composed of $PS_{1.8K}$-$PEO_{10K}$-$PS_{1.8K}$ triblock copolymers (75 wt % PEO) doped with LITFSI to a salt concentration EO/Li=15.

FIG. 12 shows the conductivity of various SPEs as a function of the temperature. Namely, the Jannash SPE [3] (PFS-PEGPG-PFS) (curve A), the Niitani SPE [4] (PFS-PEGPG- PFS) (curve B) and finally the SPE according to the invention (curve C) (SPE of Example 8).

It is noted that the SPE according to the invention has higher conductivity than that of the SPEs of the prior art, in particular at room temperature (dotted vertical line).

REFERENCES

[1] M. Armand, *Journal of Power Sources,* 4 (1979), 251.
[2] (a) Sadoway, D. R., Block and graft copolymer electrolytes for high-performance, solid-state, lithium batteries, *J. Power Sources* 2004, 129, 1-3
  (b) Ruzette, A.-V. G.; Soo, P. P; Sadoway, D. R.; Mayes, A. M., Melt-Formable Block Copolymer Electrolytes for Lithium Rechargeable Batteries, *J. Electrochemical Society* 2001, 148, A537-A543
  (c) Soo, P. P.; Huang, B.; Jang, Y.-I.; Chiang, Y.-M.; Sadoway, D. R.; A. M., Rubbery Block Copolymer Electrolytes for Solid-State Rechargeable Lithium Batteries, *J. Electrochemical Society* 1999, 148, 32-37
  (d) Trapa, P. E.; Huang, B.; Won, Y.-Y.; Sadoway, D. R.; Mayes, A. M., Block Copolymer Electrolytes Synthetized by Atom Transfer Radical Polymerization for Solid-State, Thin-Film Lithium Batteries, *Electrochemical Solid-State Letters* 2002, 5, A85-A88.
[3] K. Jankova; P. Jannasch; Hvilsted, S., Ion conducting solid polymer electrolytes based on polypentafluorostyrene-b-polyether-b-polypentafluorostyrene prepared by atom transfer radical polymerization, *J. Mater. Chem.* 2004, 14, 2902-2908.
[4] (a) Niitani, T.; Shimada, M.; Kawamura, K.; Dokko, K.; Rho, Y. H.; Kanamura, K., Synthesis Li$^+$ ion conductive PEO-PSt block copolymer electrolyte with Microphase separation structure, *Electrochemical Solid-State Letters* 2005, 8, (8), A385-A388
  (b) Niitani, T.; Shimada, M.; Kawamura, K.; Kanamura, K., Characteristics of new-type solid polymer electrolyte controlling nano-structure, *J. Power Sources* 2005, 146, 386-390,
  (c) Niitani, T.; Muramoto, H, Solid Polymer Electrolyte, EP-A-1 553 117—Nippon Soda Co.

The invention claimed is:

1. A solid polymer electrolyte (SPE) comprising at least one electrolyte salt and at least one linear triblock copolymer A-B-A, in which:
  the blocks A are polymers that are prepared from one or more styrene, o-methylstyrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, and 9-vinylanthracene, 1 to 10C alkyl methacrylates, 4-chloromethylstyrene, divinylbenzene, trimethylolpropane triacrylate, tetramethylolpropane tetraacrylate, 1 to 10C alkyl acrylates, acrylic acid or methacrylic acid monomers;
  the block B is a polymer that is prepared from one or more ethylene oxide (EO), propylene oxide (PO), poly(ethylene glycol) acrylate (PEGA) or poly(ethylene glycol) methacrylate (PEGMA) monomers,
  the proportion of blocks A of the triblock copolymer A-B-A is 10% to 35% by mass relative to the total mass of the copolymer,
  the number-average molecular mass of the triblock copolymer A-B-A is from 12,000 to 30,000g/mol, and the amount of electrolyte salt added, defined by the ratio [central block B]/[Li] in moles is 15 to 30.

2. The solid polymer electrolyte according to claim 1, in which the blocks A are homopolymers that are prepared from a single monomer, or alternatively the blocks A are random copolymers that are prepared from several monomers.

3. The solid polymer electrolyte according to claim 2, in which the blocks A are homopolymers that are prepared from styrene, o-methylstyrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 1 to 10C alkyl methacrylate, acrylic acid or methacrylic acid monomer.

4. The solid polymer electrolyte according to claim 2, in which the blocks A are random copolymers that are prepared from styrene, o-methylstyrene, p-methylstyrene, m-t-butoxystyrene, 2,4-dimethylstyrene, m-chlorostyrene, p-chlorostyrene, 4-carboxystyrene, vinylanisole, vinylbenzoic acid, vinylaniline, vinylnaphthalene, 9-vinylanthracene, 1 to 10C alkyl methacrylate, acrylic acid or methacrylic acid monomer; and from one or more other 4-chloromethylstyrene, divinylbenzene, trimethylolpropane triacrylate, tetramethylolpropane tetraacrylate, 1 to 10C alkyl acrylate, acrylic acid or methacrylic acid monomers.

5. The solid polymer electrolyte according to claim 1, in which the block B is a homopolymer or a random copolymer.

6. The solid polymer electrolyte according to claim 1, in which the blocks A are polystyrene (PS) blocks, poly(1 to 10C alkyl methacrylate) blocks, poly(acrylic acid) blocks, poly(methacrylic acid) blocks, random poly(styrene/acrylic acid) blocks, random poly(styrene/methacrylic acid) blocks, random poly(1 to 10C alkyl methacrylate/acrylic acid) blocks or random poly(alkyl methacrylate/methacrylic acid) blocks.

7. The solid polymer electrolyte according to claim 1, in which the blocks B are poly(ethylene oxide) (PEO) blocks, poly(propylene oxide) (PPO) blocks, random PEO/PPO copolymer blocks, poly(poly(ethylene glycol) methacrylate) blocks, or poly(poly(ethylene glycol) acrylate) blocks.

8. The solid polymer electrolyte according to claim 1, in which the ABA triblock copolymer is:
  copolymers in which the block B is a PEO block and the two blocks A are poly(1 to 10C alkyl methacrylate) blocks;
  copolymers in which the block B is a PEO block and the two blocks A are poly(acrylic acid) blocks or poly(methacrylic acid) blocks;
  copolymers in which the block B is a PEO block and the blocks A are polystyrene blocks;
  copolymers in which the block B is a poly(poly(ethylene glycol) acrylate) or poly(poly(ethylene glycol) methacrylate) block and the blocks A are polystyrene blocks; or
  copolymers in which the block B is a poly(poly(ethylene glycol) acrylate) or poly(poly(ethylene glycol) methacrylate) block and the blocks A are poly(acrylic acid) or poly(methacrylic acid) or poly(1 to 10C alkyl methacrylate) blocks.

9. The solid polymer electrolyte according to claim 1, in which the triblock copolymer A-B-A has one of the formulae (I), (II), (III) and (IV) below:

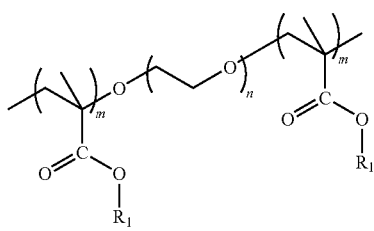

(I)

$R_1$ = C1 to C10 alkyl group

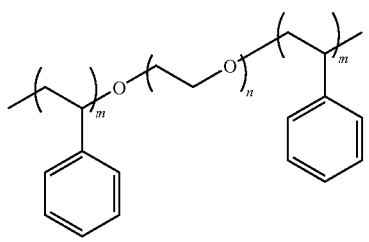

(II)

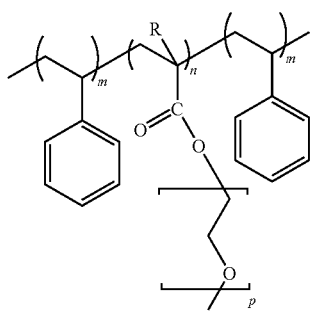

(III)

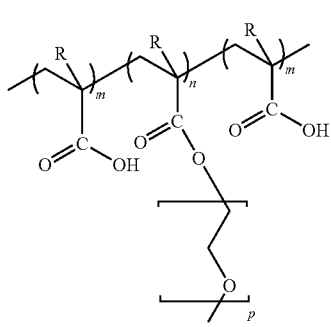

(IV)

in which m is an integer from 5 to 1000, n is an integer from 2 to 5000, p is an integer from 2 to 50, $R_1$ represents a 1 to 10C alkyl group, and R represents H or $CH_3$.

10. The solid polymer electrolyte according to claim 1, in which the copolymer A-B-A is a copolymer PS-b-PEO-b-PS.

11. The solid polymer electrolyte according to claim 1, in which the proportion of blocks A of the copolymer is 15% to 30% by mass relative to the total mass of the copolymer.

12. The solid polymer electrolyte according to claim 1, in which the number-average molecular mass of each of the blocks A of the copolymer is 1500 to 3000g/mol.

13. The solid polymer electrolyte according to claim 1, in which the number-average molecular mass of the block B is 8000 to 15 000g/mol.

14. The solid polymer electrolyte according to claim 1, in which the blocks A may be photo-cured or heat-cured after nanostructuring and production of the SPE.

15. The solid polymer electrolyte according to claim 1, comprising a single ABA copolymer; or alternatively a mixture of several ABA copolymers, each with different structural units; or a mixture of at least one linear ABA triblock copolymer and of at least one other homopolymer and/or copolymer.

16. The solid polymer electrolyte according to claim 15, in which the said other homopolymer or copolymer is a PEO, PS or PSb-PEO.

17. The solid polymer electrolyte according to claim 16, comprising a linear ABA triblock copolymer and a PEO.

18. A solid polymer electrolyte according to claim 1, in which the electrolyte salt is an alkali metal salt, a quaternary ammonium salt a quaternary phosphonium salt, a transition metal salt, hydrochloric acid, perchloric acid, fluoroboric acid, phosphoric acid or sulfuric acid.

19. The solid polymer electrolyte according to claim 18, in which the electrolyte salt is $LiCF_3SO_3$, $LiB(C_2O_4)_2 LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiN(CF_3SO_2)$, $LiB(CF_3SO_2)_2$, $LiPF_6$, $LiSbF_6$, $LiClO_4$, LiSCN, $LiAsF_6$, $NaCF_3SO_3$, $NaPF_6$, $NaClO_4$, NaI, $NaBF_4$, $NaAsF_6$, $KCF_3SO_3$, $KPF_6$, KI, $LiCF_3CO_3$, $NaClO_3$, NaSCN, $KBF_4$, $KPF_6$, $Mg(ClO_4)_2$, $Mg(BF_4)_2$, or mixtures thereof.

20. The solid polymer electrolyte according to claim 1, further comprising a mineral filler.

21. The solid polymer electrolyte according to claim 20, in which the mineral filler is $SiO_2$, $TiO_2$, $Al_2O_3$, or mixtures thereof.

22. The solid polymer electrolyte according to claim 20, in which the mineral filler represents from 1% to 20% by weight of the solid polymer electrolyte.

23. The solid polymer electrolyte according to claim 1, which is in the form of a sheet, a membrane or a film.

24. The solid polymer electrolyte according to claim 1, which is further subjected to a heat treatment at a temperature of 40 to 100° C. for a time of 2 to 300 hours.

25. A rechargeable battery or accumulator cell comprising an anode and a cathode between which is intercalated a solid polymer electrolyte according to claim 1.

26. The cell according to claim 25, in which the anode is made of lithium metal or based on carbon and the cathode is made of a lithium insertion compound.

* * * * *